United States Patent [19]
Reh et al.
[11] 3,919,599
[45] Nov. 11, 1975

[54] HORIZONTAL DEFLECTION CIRCUIT FOR TELEVISION RECEIVERS

[75] Inventors: Klaus Reh, Albershausen; Peter Schulz, Esslingen-Hegensberg, both of Germany

[73] Assignee: International Standard Electric Corporation, New York, N.Y.

[22] Filed: Sept. 27, 1973

[21] Appl. No.: 401,519

[30] Foreign Application Priority Data

Oct. 6, 1972 Germany .......... 2253386

[52] U.S. Cl. .......... 315/387; 315/411
[51] Int. Cl.[2] .......... H01J 29/70
[58] Field of Search .......... 315/27 TD, 27 R, 18, 28, 315/29, 379, 411, 387, 389

[56] References Cited

UNITED STATES PATENTS

| | | | |
|---|---|---|---|
| 3,179,843 | 4/1965 | Schwartz | 315/27 TD |
| 3,189,782 | 6/1965 | Heffron | 315/27 TD |
| 3,210,601 | 10/1965 | Walker | 315/27 TD |
| 3,375,399 | 3/1968 | Kongable | 315/27 TD |
| 3,778,670 | 12/1973 | Nagai | 315/27 TD |
| 3,814,978 | 6/1974 | Dobbert | 315/27 TD |

*Primary Examiner*—Maynard R. Wilbur
*Assistant Examiner*—G. E. Montone
*Attorney, Agent, or Firm*—John T. O'Halloran; Menotti J. Lombardi, Jr.; Peter Van Der Sluys

[57] ABSTRACT

A horizontal deflection circuit for a television receiver including a deflection unit having a sweep control, commutation switch and a controlled switch for controlling the energy stored in the horizontal final stage. Said energy controlling means including a thyristor for controlling switch energy returned to the power line so that the energy stored in a commutating capacitor is essentially constant for each sweep and the deflection current is independent of line voltage.

6 Claims, 1 Drawing Figure

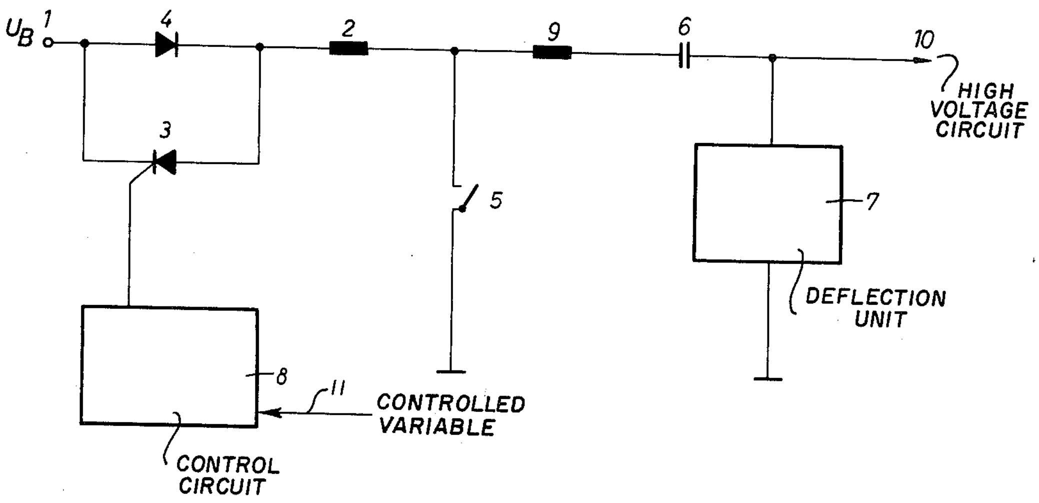
$U_B$
1
4
2
9
6
10
HIGH VOLTAGE CIRCUIT
3
5
7
DEFLECTION UNIT
8
11
CONTROLLED VARIABLE
CONTROL CIRCUIT

HORIZONTAL DEFLECTION CIRCUIT FOR TELEVISION RECEIVERS

BACKGROUND OF THE INVENTION

The present invention relates to a horizontal deflection circuit for television receivers which essentially comprises a unit controlling the horizontal sweep, a commutating unit, and a deflection unit.

The energy applied to such a horizontal deflection circuit must be variable, and a suitable supply circuit consists, for example, of a d.c. voltage source and a storage inductance.

Horizontal sweep or deflection circuits are known in which, for producing a periodic sawtooth current within the respective deflection coil of the picture tube, the deflection coil is connected, in a first branch circuit, via a first controlled switch, which conducts in both directions, to a sufficiently large capacitor serving as a current source, the controlled switch being formed by the inverse-parallel connection of a controlled rectifier and a diode. The control electrode of the rectifier is connected to a driving-pulse source, which renders the switch conductive during part of the sawtooth sweep. The controlled rectifier is turned off by a commutation process, i.e. by a current reversal in the controlled rectifier, which is initiated by a second controlled switch.

The first controlled switch also forms part of a second branch circuit, which contains, in series with the controlled switch, a second current source and a reactance capable of oscillating. When the first switch is closed, the reactance, essentially consisting of a coil and a capacitor, receives energy from the second current source in a particular time interval. This energy, which is taken from the second current source, corresponds to the circuit losses caused during the previous deflection period.

In the above-described, known basic circuit, however, no consideration is given to the fact that it is common practice to connect the high-voltage transformer, which is necessary for the operation of the picture tube, to the horizontal final stage as well.

In such a circuit, which is largely identical to the first described circuit, the high voltage necessary to operate the picture tube is produced by stepping up the horizontal flyback pulses to the necessary voltage in a step-up transformer and applying the voltage to the picture tube via a rectifier arrangement. The high-voltage transformer is connected in parallel with the deflection system. Since the energy taken from the high-voltage transformer is not constant due to the fact that it is a function of the changes in the beam current, the high voltage must be readjusted because of the finite resistance of the high-voltage source. This means that the energy applied to the horizontal final stage must be equal to the above referred to losses of the deflection circuit itself plus the energy necessary to operate the tube.

It has already been mentioned that the energy applied to the horizontal final stage is stored in a reactance. The control of the applied energy is effected by connecting a capacitor, here the flyback capacitor of the horizontal final stage, to a d.c. voltage source via an inductance inserted between the d.c. voltage source and the capacitor, with the latter being nearly at resonance with this inductance. A change in the applied energy is made by varying the inductance. This is accomplished by the parallel connection of an additional variable inductance which is represented by a transductor.

The necessary extent of the control range of such a supply circuit is substantially influenced by the variation in the voltage of the d.c. voltage source. This voltage is derived from the line voltage.

The known supply circuit has the disadvantage that the inductances, i.e. both the storage inductance and the parallel-connected transductor, must be chosen to be very large. This will become readily apparent if the extreme cases regarding the variations in supply voltage are shortly considered.

If the value of the supply voltage lies at the lower permissible limit, the inductive reactance of the transductor must be so large that the value of the overall inductance of the parallel connection is determined virtually only by the storage inductance. If, however, the value of the supply voltage lies at the upper limit, the transductor is to have the lowest possible inductive reactance, so that the value of the overall inductance of the parallel connection is determined virtually only by the transductor.

This method is unsatisfactory because of the high cost of transductor component, and the excessive heating caused by the conversion of considerable energy.

SUMMARY OF THE INVENTION

It is the object of the present invention to provide a horizontal deflection circuit of the kind referred to which has a supply circuit which is as simple and inexpensive as possible, with the control range of the known circuit arrangement at least being preserved.

The horizontal deflection circuit according to the invention is characterized in that a rectifier whose forward direction corresponds to the flow direction of the supply current is connected into the series connection consisting of a d.c. voltage source and a storage inductance, and that a controlled semiconductor switch is connected in parallel with the rectifier which semiconductor switch is constantly "off" in the flow direction of the supply current and is controllable in the opposite current direction as a function of a controlled variable developed across the deflection circuit.

The considerable economical advantage of this solution lies in the saving of an expensive inductive component. For the operation of a television set it is also important that the heat loss of the horizontal deflection circuit be low.

Further advantages of the invention as well as the operation of the circuit will become apparent from the following description and from the accompanying drawing.

DESCRIPTION OF THE DRAWING

The drawing shows a simplified circuit diagram of the horizontal deflection circuit which contains only those elements which are thought necessary for a thorough understanding of the invention, i.e. particularly the elements of the supply circuit.

DESCRIPTION OF THE PREFERRED EMBODIMENT

Applied to the input terminal 1 is the d.c. supply voltage $U_B$, which is derived from the line voltage and may vary over a range of ± 15% in accordance with the line-voltage fluctuations. Connected to this input terminal 1 is the storage inductance 2. A series connection comprising the commutating coil 9, the commutating capacitor 6, and the deflection unit 7 is connected to the output of the storage inductance 2. The deflection unit 7 essentially contains the horizontal deflection coils. Connected in parallel with the above series connection is the commutator switch 5.

The connection 10 is to indicate schematically that the high-voltage-generating circuit, too, is connected to the horizontal deflection circuit.

Interposed between the input terminal 1 and the storage inductance 2 is a diode 4 whose forward direction corresponds to the direction of the supply current; connected in parallel therewith is a controlled semiconductor switch 3, in this case a thyristor, whose forward direction is opposite to that of the diode 4.

The return of energy to the power line can now be controlled by suitable choice of the "on" time of the thyristor 3 because, when the current flows in this direction, the diode 4 is reverse-biased.

By this control, the residual energy existing in the commutating capacitor 6 at the time the commutator switch 5 is closed again can always be kept constant.

This means, however, that the amplitude of the deflection current is made independent of the line-voltage fluctuation because it depends exclusively on the energy existing in the commutating capacitor 6 at the above instant.

If a thyristor is used, it must be taken into account that a conventional thyristor can only be turned off by reversing the direction of current. This means for the choice of the "on" period of the semiconductor or for the return of energy that the turn-off instant is fixed at the time at which the commutator switch 5 closes again. Control of the return of energy can thus be achieved only by varying the turn-on instant of the thyristor 3.

To this end, a control circuit 8 is provided. Control circuit 8 is a pulse width modulation circuit for providing a pulse to thyristor 3 to turn the thyristor on. Applied to this control circuit through a connector 11 is a controlled variable, such as the voltage value of the kickback pulse developed across the high-voltage-generating circuit.

The information concerning the instant at which the thyristor 3 is turned on is then derived from a comparison between the nominal and actual values of this voltage.

What is claimed is:

1. A horizontal deflection circuit for television receivers, comprising: means for controlling a horizontal sweep; means for controlling commutation;

a deflection unit controlled by the previously mentioned means;

a dc voltage source;

a storage inductance connected in series with the dc voltage source and the deflection unit, said commutation control means formed and arranged to connect the storage inductance across the dc voltage source during periods of commutation;

means connected in series with the storage inductance for permitting current to flow in a first direction from the source to the inductance while blocking reverse current flow; and an electronic switch means connected in parallel with the last mentioned means for blocking current flow in the first direction to the inductance from the source and for allowing a current flow in the opposite direction during a period controlled in accordance with a controlled variable developed across the deflection unit during commutation and corresponding to the energy requirements of the horizontal deflection circuit.

2. A horizontal deflection circuit as described in claim 1, wherein the electronic switch means comprises:

a semiconductor switch; and a control circuit for controlling the semiconductor switch in accordance with the controlled variable developed across the deflection unit during commutation.

3. A horizontal deflection circuit as described in claim 2 wherein the semiconductor switch comprises a thyristor having a gate connected to the control circuit for receiving a pulse signal therefrom.

4. A horizontal deflection circuit as described in claim 2 wherein the semiconductor switch is turned on prior to commutation and is caused to turn off by the current reversal during commutation.

5. A horizontal deflection circuit as described in claim 2 wherein the control variable is a horizontal kick-back pulse.

6. A horizontal deflection circuit as described in claim 2 wherein the control circuit is a pulse width modulator for providing a pulse having a width corresponding to the controlled variable.

* * * * *